(12) United States Patent
Vincent et al.

(10) Patent No.: US 6,196,520 B1
(45) Date of Patent: Mar. 6, 2001

(54) AIR DISTRIBUTION DEVICE WITH A SHUTTER OF THE DRUM TYPE, IN PARTICULAR FOR A MOTOR VEHICLE

(75) Inventors: Philippe Vincent, Epernon; Thierry Barbier, Elancourt, both of (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/069,630

(22) Filed: Apr. 29, 1998

(30) Foreign Application Priority Data

Apr. 30, 1997 (FR) .................................................. 97 05393
Apr. 30, 1997 (FR) .................................................. 97 05405

(51) Int. Cl.[7] .................................................. F16K 31/54
(52) U.S. Cl. .................. 251/56; 137/875; 251/129.11; 251/158; 251/249.5
(58) Field of Search .................. 251/56, 229, 129.11, 251/248, 249.5, 279, 280, 298, 160, 158; 137/875, 876

(56) References Cited

U.S. PATENT DOCUMENTS

| 2,910,266 | * | 10/1959 | Condello et al. | 251/56 X |
|---|---|---|---|---|
| 4,013,264 | * | 3/1977 | Friedell | 251/56 |
| 4,106,748 | * | 8/1978 | Niino et al. | 251/56 X |
| 4,280,681 | * | 7/1981 | Harris | 251/56 X |
| 4,288,060 | * | 9/1981 | Mittell | 251/56 X |
| 4,436,280 | * | 3/1984 | Geisow | 251/56 |
| 4,515,208 |   | 5/1985 | Sakurai et al. . | |
| 4,627,567 | * | 12/1986 | Thorn | 137/875 X |
| 5,106,052 | * | 4/1992 | Datta et al. | 251/56 |

FOREIGN PATENT DOCUMENTS

| 44 07 777 | 9/1995 | (DE) . |
|---|---|---|
| 0 394 855 | 10/1990 | (EP) . |
| 2 591 949 | 6/1987 | (FR) . |
| 2 600 122 | 6/1988 | (FR) . |
| 2 608 102 | 6/1988 | (FR) . |

\* cited by examiner

Primary Examiner—Harold Joyce
(74) Attorney, Agent, or Firm—Morgan & Finnegan LLP (57) ABSTRACT

An air distribution device comprises a casing (10) provided with a cylindrical wall (12) having at least one air passage opening (14, 16), a shutter (20) mounted so as to pivot with respect to an axis of rotation (X—X) and having a generally cylindrical obturation wall, which is mounted so as to movable with respect to a body of the shutter, consisting of two plates, in a direction substantially radial with respect to the axis of rotation (X—X) of the shutter by virtue of movement means (46, 48) synchronised with the rotation of the shutter, which makes it possible to move the obturation wall (24) away from the wall (12) when the shutter is in an open position (P1, P2) and bring the obturation wall (24) closer to the wall (12) of the casing when the shutter is in a closed position.

30 Claims, 9 Drawing Sheets

AIR DISTRIBUTION DEVICE WITH A SHUTTER OF THE DRUM TYPE, IN PARTICULAR FOR A MOTOR VEHICLE

FIELD OF THE INVENTION

The invention related to an air distribution device having a shutter of the drum type suitable for use in a motor vehicle heating and/or air conditioning installation.

The invention concerns more particularly a device comprising a casing provided with a generally cylindrical wall having at least one air passage opening, a shutter mounted so as to pivot with respect to an axis of rotation and having a generally cylindrical obturation wall and rotational control means for bringing the shutter into chosen positions in which the obturation wall selectively controls the air passage opening or openings of the casing.

BACKGROUND OF THE INVENTION

Shutters of this type are already known, which are also referred to as "drum shutters", in which the obturation wall of the shutter is normally a length of a cylindrical wall which pivots inside a length of a cylindrical wall forming part of a distribution casing, the two cylindrical walls being coaxial.

Generally the cylindrical wall of the casing has several passage openings which are spaced apart angularly and which can be closed off or opened selectively by the obturation wall of the shutter according to the angular position taken by the latter. These devices have the advantage of enabling all the air distribution to be controlled with a single shutter placed in a single casing, which simplifies the design and also affords greater compactness.

One of the problems posed by this type of shutter is that of airtightness. It is in fact necessary for the shutter to guarantee perfect airtightness of the different air passage openings, also referred to as "vents", when the shutter is in a closure position.

In the past, this airtightness is provided by a joint, for example by a foam joint covered with a polyamide cloth, bonded externally to the periphery of the obturation wall of the shutter.

Such a joint theoretically guarantees good airtightness, but at the cost of a high maneuvering force, because of the friction generated by the joint.

In addition, this joint has a tendency to lose its sealing capability because of wear, and is sensitive to ambient humidity.

It must also be stated that producing such a joint is tricky and that the resulting cost is relatively high.

SUMMARY OF THE INVENTION

An object of the invention is notably to overcome the aforementioned drawbacks.

The present invention proposes an improved air distribution device, in which the obturation wall is mounted so as to be movable with respect to a body of the shutter, consisting of two plates, in a direction substantially radial with respect to the axis of rotation of the shutter body, and in which the device comprises movement control means, coordinated with the rotation control means in order to move the obturation wall of the shutter away from the wall of the casing when the shutter is in an open position and to bring the obturation wall of the shutter closer to the wall of the casing when the shutter is in a closed position.

Thus, whereas in the past the obturation wall was always situated at a constant distance with respect to the axis of rotation of the shutter, the invention makes provision for varying this distance according to the angular position of the shutter. When the shutter is in an open position, the obturation wall is away from the wall of the casing, so that there is no friction between these two walls. When the shutter is thereafter moved in the direction of a closed position, the obturation wall of the shutter is moved away from the axis in order to move closer to the wall of the casing and come into contact with it, when the obturation wall is opposite a passage opening in the casing. The movement of the shutter body and the movement of the obturation wall of the shutter are coordinated and can be effected either simultaneously or in succession.

It is thus no longer necessary to provide sealing joints operating on rotation like the ones used in the past.

When the device comprises a sealing joint, this is compressed only in the radial direction and at the moment when the obturation wall of the shutter arrives in the closed position.

Thus the rotational movement of the shutter takes place without friction and therefore without maneuvering force. In addition, wear on the joint is minimal since the latter undergoes only compression in a substantially radial direction, at the moment of closure.

The movement of the obturation wall with respect to the body of the shutter in a substantially radial direction can take place in two ways.

In a first embodiment, the obturation wall is movable in translation with respect to the body of the shutter and the movement control means comprise translation control means.

In a second embodiment, the obturation wall is movable in rotation with respect to the body of the shutter and the movement control means comprise rotation control means.

In a first general embodiment of the invention, the movement control means comprise a lever fixed to a drive spindle coaxial with the axis of rotation of the shutter body, this lever being articulated on the obturation wall of the shutter, either directly, or indirectly by means of at least one connecting rod, transmission means having a chosen transmission ratio being connected to the rotation control means and to the movement control means.

Thus the movement of the shutter is effected in a particularly simple fashion by means of a lever, the rotation of which is coordinated with that of the shutter body, and if applicable at least one connecting rod.

In one embodiment of the invention, the device comprises a drive shaft on which there is fixed a driving pinion driving a toothed sector fixed to the body of the shutter and driving a pinion fixed to the spindle of the lever with the interposition of an intermediate pinion.

The device of the invention applies in particular to the case where the shutter can be moved between two closed positions with a given angular movement. In such a case, the transmission ratio is chosen so that the lever turns through an angle of 360° minus the value of the angular movement, when the shutter pivots from one of its two positions to the other.

Thus, in each of the closed positions, the obturation wall of the shutter is always at the same distance from the axis of rotation of the shutter.

Advantageously, in each of the closed positions of the shutter, the connecting rod is situated in line with the lever so that the obturation surface of the shutter is always furthest away from the axis of rotation of the shutter body.

In another embodiment, the device comprises a drive shaft on which there are fixed a drive pinion driving a toothed sector fixed to the body of the shutter and a toothed sector driving a pinion fixed onto the rotation spindle of the shutter.

This solution is particularly suitable in cases where the shutter can be moved between at least three closure positions with a given angular movement between two successive closed positions, the transmission ratio being chosen so that the lever turns through an angle of 360° plus the aforementioned angular movement, when the shutter passes from one of two consecutive closure positions to the other.

In another embodiment of the invention, the device comprises a drive shaft coupled to the body of the shutter and also comprises a transmission pinion mounted loose around a spindle fixed to the body of the shutter and meshing on the one hand with a pinion fixed onto the lever spindle and on the other hand with teeth in the shape of an arc of a circle carried by the casing and centered on the axis of rotation of the shutter body and of the lever.

In this embodiment, the transmission pinion, the pinion fixed onto the lever spindle and the teeth in the shape of an arc of a circle can all be situated outside the shutter, or else inside the shutter.

As a variant, the transmission pinion is a pinion in the form of an annulus rotating about a hub fixed to the shutter body, the transmission pinion, the pinion fixed onto the lever spindle and the teeth in the shape of an arc of a circle being situated outside the shutter.

In another embodiment of the invention, the movement control means comprise at least one connecting rod articulated on the obturation wall of the lever and on a transmission pinion mounted loose around a spindle fixed to the body of the shutter, the transmission pinion meshing with teeth in the shape of an arc of a circle fixed with respect to the casing and centered with respect to the axis of rotation of the body of the shutter.

In a variant embodiment, the connecting rod is articulated directly on the transmission pinion, the transmission pinion being situated outside the shutter and the teeth in the shape of an arc of a circle being formed on the casing.

In a variant, the connecting rod is articulated directly on the transmission pinion, the transmission pinion being situated inside the shutter, and the teeth in the shape of an arc of a circle being integral with a fixed shaft on which the body of the shutter turns.

In another variant, the connecting rod is articulated on a lever situated inside the shutter body and coupled to the transmission pinion, which is situated outside the shutter.

In another embodiment of the invention, the lever forms part of a toothed pinion mounted so as to rotate freely with respect to the axis of rotation of the shutter and driven in rotation by an intermediate pinion cooperating with the toothed pinion and with internal teeth in the shape of an arc of a circle carried by the casing and centered on the axis of rotation of the shutter.

In another embodiment of the invention, the lever forms part of a toothed pinion mounted so as to rotate loosely about a spindle fixed to the body of the shutter and meshing on external teeth in the shape of an arc of a circle fixed to the casing and centered on the axis of rotation of the shutter.

It is also possible to provide the movement control of the obturation wall of the shutter without having recourse to a means of the connecting rod/lever type.

Thus, in another embodiment of the invention, the movement control means comprise an actuator, chosen from amongst an electropneumatic cylinder and a solenoid valve, interposed between the obturation wall of the shutter and the axis of rotation of the shutter.

This actuator is advantageously integrated into the obturation wall of the shutter.

In another embodiment of the invention, the movement control means comprise at least one cam track carried by the casing and able to serve as guidance for a bearing finger, fixed to the obturation wall of the shutter, the bearing finger being returned elastically in the direction of the cam.

In another embodiment of the invention, the movement control means comprise a cam track of annular configuration fixed to the body of the shutter and able to cooperate with at least one cam follower fixed to the casing.

Advantageously, the movement control means comprise four cam followers in the form of fingers, disposed at 90° with respect to each other, and dependent on an annulus surrounding the axis of rotation of the shutter.

According to another aspect of the invention, the obturation wall carries a sealing joint so as to provide a seal when the shutter is in the closed position.

Preferably the sealing joint is provided with a deformable lip extending at the periphery of the obturation wall.

Thus this deformable lip undergoes only a compression in a substantially radial direction, which minimizes wear on the joint.

In one embodiment of the invention, the deformable lip of the joint extends over four sides of the obturation wall, namely two longitudinal sides parallel to the rotation spindle of the shutter and two transverse sides perpendicular to the axis of the said rotation spindle.

In a variant, the sealing joint comprises a foam joint carried on the outside of the obturation wall of the shutter.

Preferably the sealing joint has a bellows extending between an external peripheral rim able to be attached to an edge of the body of the shutter and an internal peripheral rim able to be attached to an edge of the obturation wall.

Thus this bellows also provides a seal between the body and the obturation wall of the shutter.

In one embodiment of the invention, the edge of the shutter body and the edge of the obturation wall are parallel to the axis of rotation of the shutter, the external peripheral rim and the internal peripheral rim are substantially in line with each other when the shutter is in the closed position and offset with respect to each other when the shutter is in the open position.

In this embodiment, the internal peripheral rim and the external peripheral rim are advantageously produced in the form of grooves moulded respectively onto the edge of the shutter body and the edge of the obturation wall.

In another embodiment, the edge of the shutter body extends perpendicularly to the axis of rotation of the shutter and the edge of the obturation wall extends parallel to the axis of rotation of the shutter, the external peripheral rim and the internal peripheral rim extending perpendicularly to each other both in the open position and in the closed position of the shutter.

In this embodiment, the external peripheral rim is advantageously produced in the form of a groove moulded onto the edge of the shutter body, while the internal peripheral rim is advantageously produced in the form of two parallel strips moulded on each side of the edge of the obturation wall.

According to another advantageous characteristic of the invention, the bellows is moulded in one piece so as to have a configuration at rest which corresponds substantially to the configuration in the open position of the shutter.

Thus the bellows has a tendency to act on the obturation wall in order to bring it closer to the axis of rotation of the shutter.

BRIEF DESCRIPTION OF THE DRAWINGS

In the following description, given solely by way of example, reference is made to the accompanying drawings, in which.

DETAILED DESCRIPTION OF THE INVENTION

Figure 1:
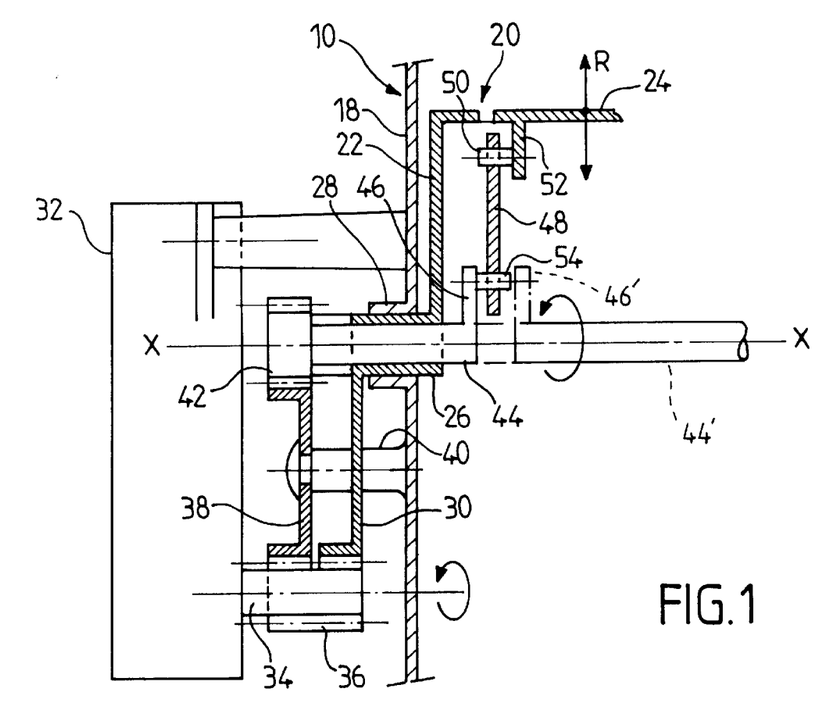
FIG. 1 is a partial view in longitudinal section of a device according to a first embodiment of the invention.
Figure 2:
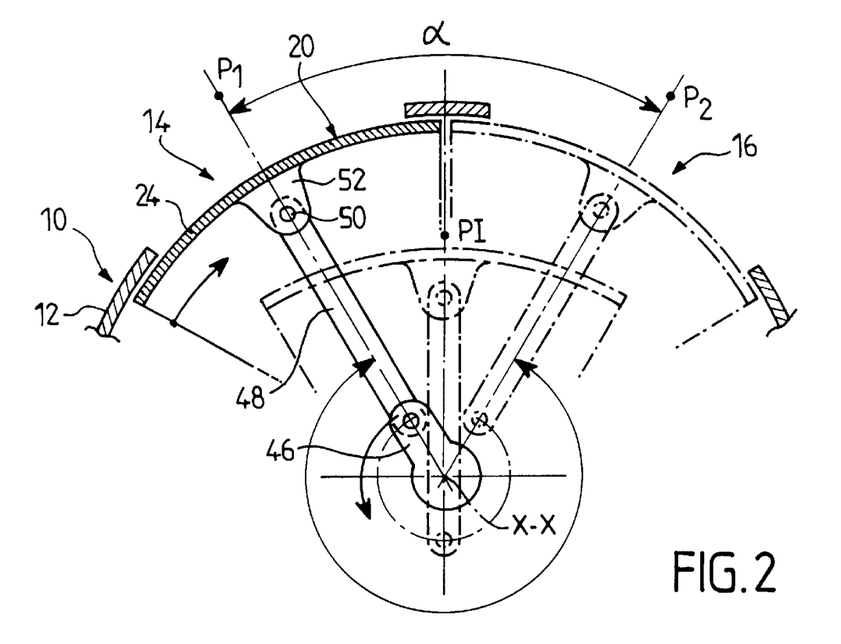
FIG. 2 is a partial view in transverse section of the device of FIG. 1.

Reference is made first of all to FIGS. 1 and 2, which depict a distribution casing 10 comprising a cylindrical wall 12 with axis X—X (FIG. 2), interrupted in order to define two openings 14 and 16 offset angularly with respect to each other. The wall 12 is connected to two plates 18, one of which is depicted in FIG. 1. The casing 10 houses internally a shutter 20, referred to as a drum shutter, comprising two plates 22 constituting the shutter body, one of which is visible in FIG. 1, and an obturation wall 24 mounted so as to be movable with respect to the plates 22, in a radial direction R with respect to the axis X—X. The shutter 20 is able to be moved in rotation about the axis X—X between two positions P1, P2 (FIG. 2) in which the obturation wall 24 respectively closes off the openings 14 and 16, the movement from the position Pi to the position P2 or vice versa taking place with an angular movement $\alpha$.

Each of the plates 22 of the shutter 20 is fixed to a hub 26 passing through a hub 28 of the casing and fixed to a toothed sector 30 (FIG. 1).

The shutter is driven in rotation between its positions P1 and P2 by means of an electric motor 32 fixed to the outside of the casing 10 and having a drive shaft 34 on which there is fixed a toothed pinion 36 which on the one hand meshes with the toothed sector 30 and on the other hand meshes with a transmission pinion 38 mounted loose on a support 40 fixed to the outside of the casing 10. The transmission pinion 38 cooperates so as to mesh with a pinion 42 fixed at one end of a shaft 44, which extends in the direction of the axis X—X and which carries, at its other end, a radial lever 46. A connecting rod 48 is articulated at 50, on the one hand on a support 52 provided inside the obturation wall 24 and on the other hand on an articulation 54 fixed to the lever. The wall 24 is fixed with respect to rotation to the shutter body and can be moved in translation with respect to the latter in the radial direction R (FIG. 1) by means of the lever 46 and connecting rod 48.

In fact, the device comprises two connecting rods 48 and two levers 46 provided respectively at the two ends of the movable obturation wall 24.

In each of the closed positions P1 and P2, the connecting rod 48 is situated in line with the lever 46 (FIG. 2) so that the obturation wall 24 is as far away as possible from the axis X—X.

The aforementioned pinions offer a transmission ratio chosen so that, in each of the positions P1 and P2, the connecting rod 48 is situated in line with the lever 46 (FIG. 2). Thus, when the shutter moves from the position P1 to the position P2, or vice versa, with a movement $\alpha$, the lever 46 pivots through an angle equal to 360°-$\alpha$.

When the shutter is in an intermediate position PI between the positions P1 and P2, the connecting rod 48 and the lever are aligned, but not in line with each other, so that the distance between the obturation wall 24 and the axis X—X is at a minimum.

Thus, when the shutter passes from the position P1 to the position P2, or vice versa, its obturation surface 24 is first of all in internal contact with the wall 12 of the casing, and then this obturation wall 24 moves progressively away from the wall 12, moving closer to the axis X—X in order to arrive at a minimum value in the intermediate position PI. Next, when the shutter moves towards the other end position, the wall 24 moves radially in the opposite direction in order to move progressively towards its closed position, in which the movable wall 24 is in contact with the wall 12 of the casing (FIG. 2).

Consequently, passage from the position P1 to the position P2, or vice versa, takes place without friction between the wall 24 of the shutter and the wall 12 of the casing. When the shutter arrives in one of the closed positions P1 or P2, its obturation wall 24 moves radially closer to the wall 12, so that the seal is produced at the end of radial travel. It is possible to provide a sealing joint, for example on the external periphery of the movable wall 24. The joint is then compressed in a radial direction, but only when the shutter arrives in the end of travel position.

As a variant, the spindle 44 and lever 46 could be situated on the internal side of the shutter, as indicated respectively at 44' and 46' in FIG. 1.

In a variant, not shown, the connecting rod 48 could be omitted and the lever 46 would then be articulated directly on the obturation wall 24 of the shutter.

Figure 3:
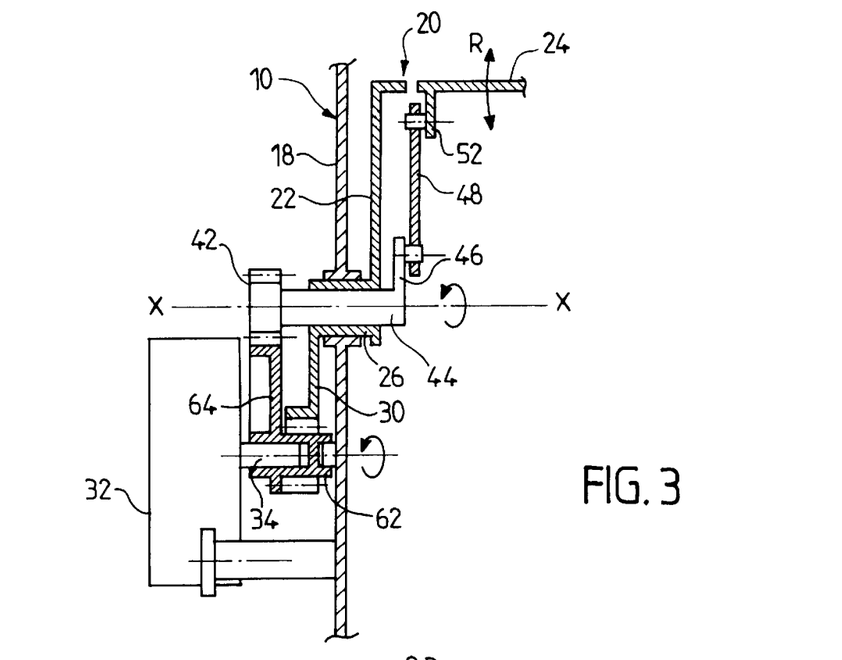
FIG. 3 is a partial view in longitudinal section of a device according to a second embodiment of the invention.
Figure 4:
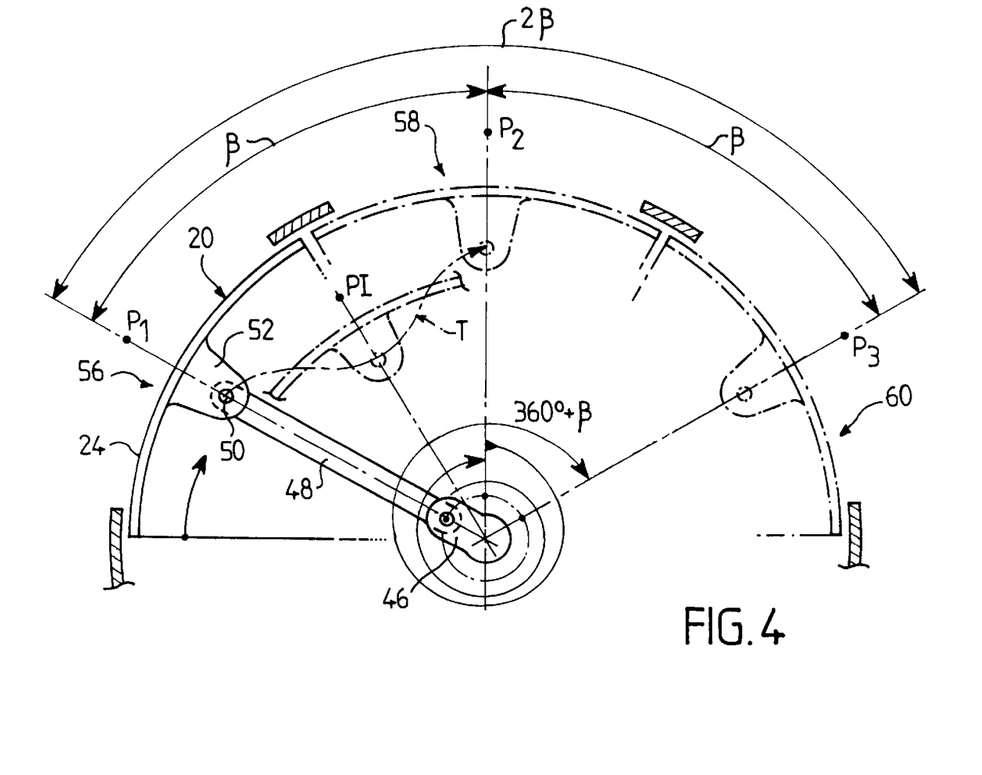
FIG. 4 is a view in transverse section of the device of FIG. 3.

Reference is now made to FIGS. 3 and 4, which depict another embodiment of the invention, in which the casing 10 has three openings 56, 58 and 60 each offset angularly by an angle β, the total movement of the shutter 20 being equal to 2β.

On the drive shaft 34 of the motor 32 there are fixed on the one hand a toothed pinion 62 which meshes with the toothed sector 30 fixed to the shutter and on the other hand a toothed sector 64 which meshes with a toothed pinion 42 similar to the one described above (FIG. 1). The toothed sectors 30 and 64, and the pinions 62 and 42, define a transmission ratio such that, in each of the three positions P1, P2 and P3 of the shutter (FIG. 4), the connecting rod 48 is situated, on each occasion, in line with the lever 46, so that the distance between the obturation wall 24 of the shutter and the axis X—X is at a maximum.

When the shutter passes from one closed position to an adjacent closed position, it undergoes an angular movement β, and the lever pivots through an angle corresponding to 360°+β in order to satisfy the aforementioned condition.

In passing from one closed position to another, the shutter on each occasion passes through an intermediate position PI (one of which is depicted in FIG. 4), in which the distance between the obturation wall 24 and the axis X—X is at a minimum. The path of the articulation spindle 50 (between the connecting rod 80 and the support 52) is depicted schematically (reference T) in FIG. 4.

Figure 5:
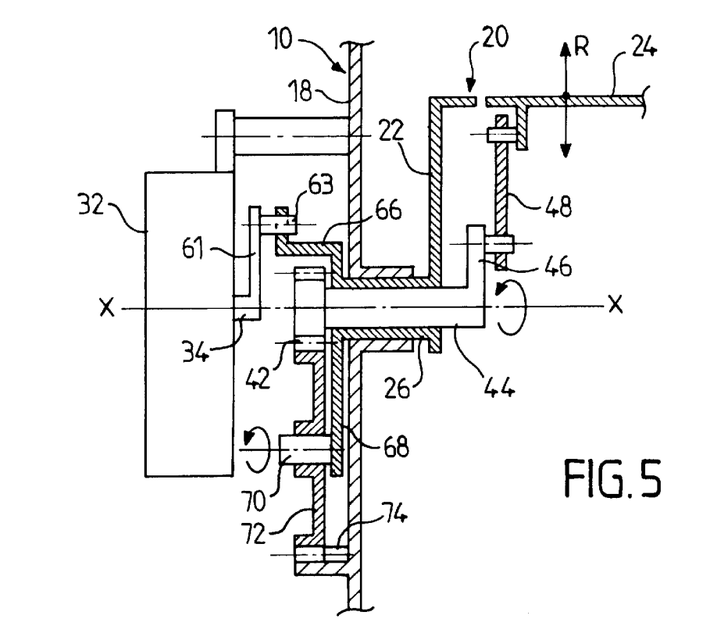
FIG. 5 is a partial view of a longitudinal section of a device according to a third embodiment of the invention.

In the embodiment in FIG. 5, to which reference is now made, the shaft 34 of the motor 32 carries a radial lever 61 provided with a finger 63 cooperating with a lever 66 fixed to the barrel 26 of the shutter 20. This lever 66 is situated outside the plate 18 of the casing. The shutter also comprises another lever 68 situated opposite the lever 66 and also situated outside the plate 18 of the casing. This lever 68 carries a shaft 70 on which there is loosely mounted a transmission pinion 72 which meshes on the one hand with a toothed pinion 42 similar to the one in FIGS. 1 and 3 and on the other hand with teeth 74 in the shape of an arc of a circle, integral with the plate 18 of the casing and formed outside it. These teeth 74 are centred on the axis of rotation X—X common to the shutter body and to the lever.

In the embodiment in FIG. 5, the transmission pinion 72, the pinion 42 fixed onto the lever spindle and the teeth in the shape of an arc of a circle 74 are situated outside the shutter and also outside the casing.

Figure 6:
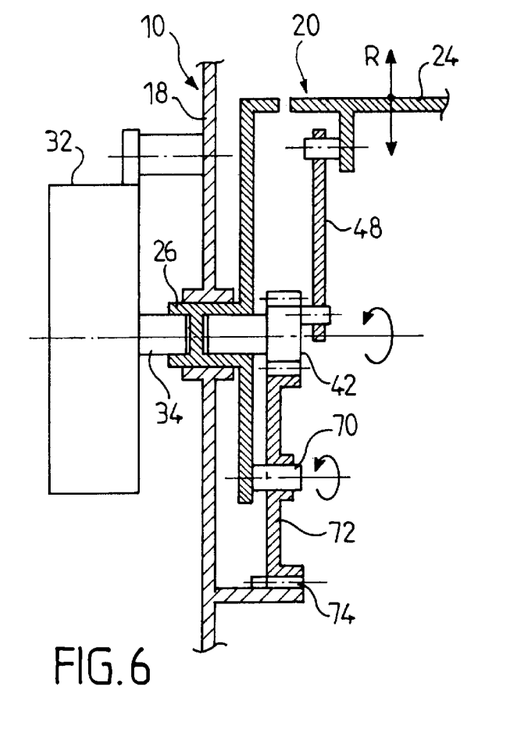
FIGS. 6 and 7 are views similar to that of FIG. 5 in variant embodiments.

In the embodiment in FIG. 6, to which reference is now made, the transmission pinion 72, the pinion 42 fixed onto the lever spindle and the teeth in the shape of an arc of a circle 74 are situated on the inside of the shutter, that is to say also on the inside of the plate 18 of the casing.

Figure 7:
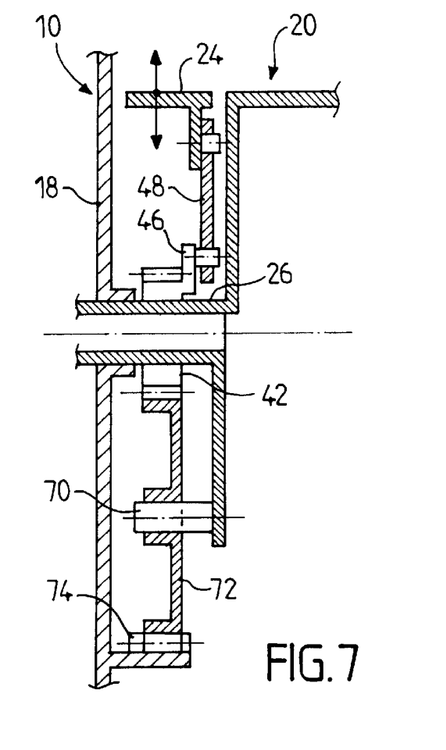

In the embodiment in FIG. 7, to which reference is now made, the transmission pinion 42 is a pinion in the form of an annulus rotating about the hub 26 fixed to the shutter body. In addition, the transmission pinion 72, the pinion 42 fixed onto the shutter spindle and the teeth 74 in the shape of an arc of a circle are situated outside the shutter, but inside the casing.

In the embodiments in FIGS. 5 to 7, the transmission pinion 72 makes it possible, in cooperation with the pinion 42 and teeth 74, to communicate a chosen transmission ratio between the shutter body and the lever actuating the obturation wall 24 of the shutter. Otherwise the operation of the device is identical, the principle being able to be applied to a device having two or more air passage openings.

Figures 8, 9:
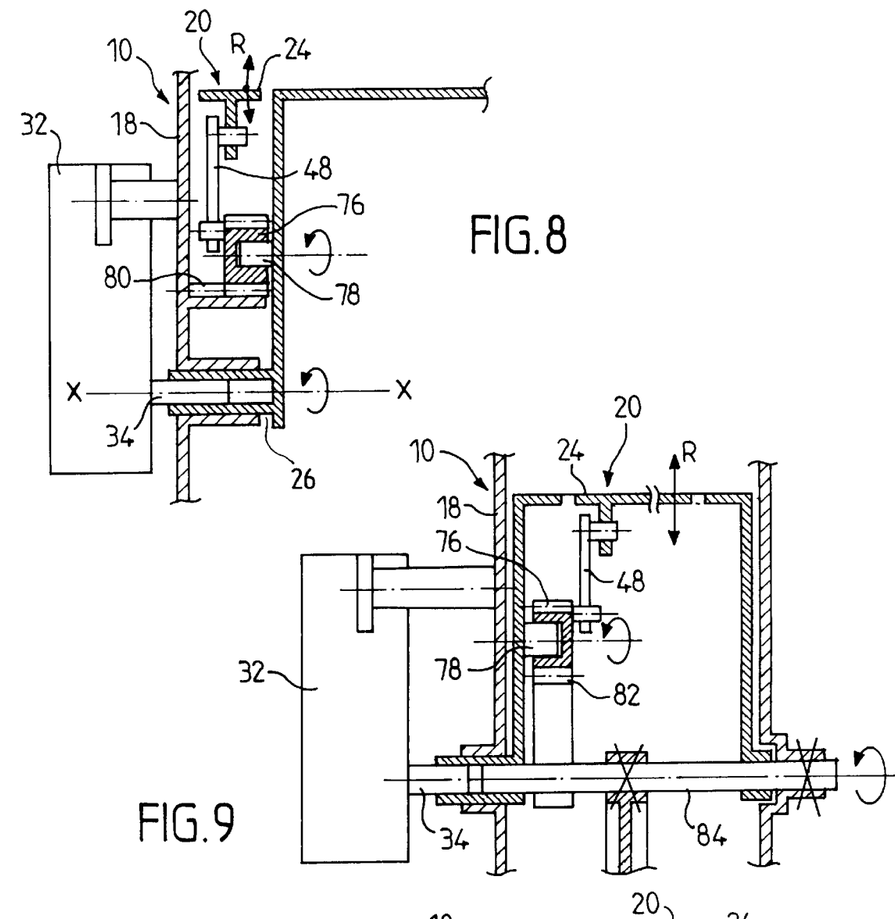
FIG. 8 is a partial view in longitudinal section of a device according to a fourth embodiment of the invention.
FIGS. 9 and 10 are views similar to that of FIG. 8 in variant embodiments.

In the embodiment in FIG. 8, to which reference is now made, the connecting rod 48 is articulated not on the lever but on a transmission pinion 76 mounted loose about a spindle 78 fixed to the body of the shutter and extending parallel to and at a distance from the axis X—X. This pinion 76 meshes with teeth in the shape of an arc of a circle 80 formed on the plate 18 of the casing. These teeth 80 are centered about the axis X—X and are situated on the internal side of the casing and externally to the shutter. The rotational movement of the shutter is effected directly by the drive shaft 38, which is coupled to the hub 26 by any suitable means. When the shutter moves angularly, the transmission pinion 76 is driven in rotation about its axis because of the cooperation with the teeth 80, which causes the movement of the connecting rod 48 and the translational movement of the movable wall 24 of the shutter. By suitably choosing the transmission ratio afforded by the transmission pinion 76 and the teeth 80, it is arranged so that the distance between the obturation wall 24 of the shutter and the axis X—X is at a maximum, each time the shutter arrives in a position of closing an air passage opening.

In the embodiment in FIG. 9, which constitutes a variant of the previous embodiment, the transmission pinion 76 is situated inside the casing and cooperates with teeth in the shape of an arc of a circle 82 integral with a fixed shaft 84 about which the shutter body turns.

Figure 10:
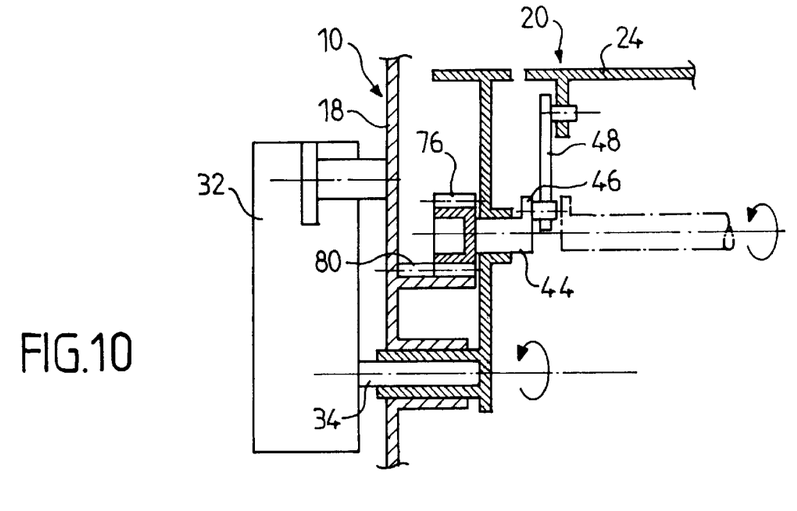

In the variant embodiment in FIG. 10, which is related to that of FIG. 8, the connecting rod 48 is articulated on a lever 46 situated inside the shutter body, this lever 46 being coupled with respect to rotation to the transmission pinion 76, which is situated outside the shutter body and cooperates with teeth 80 similar to those in FIG. 8.

Figure 11:
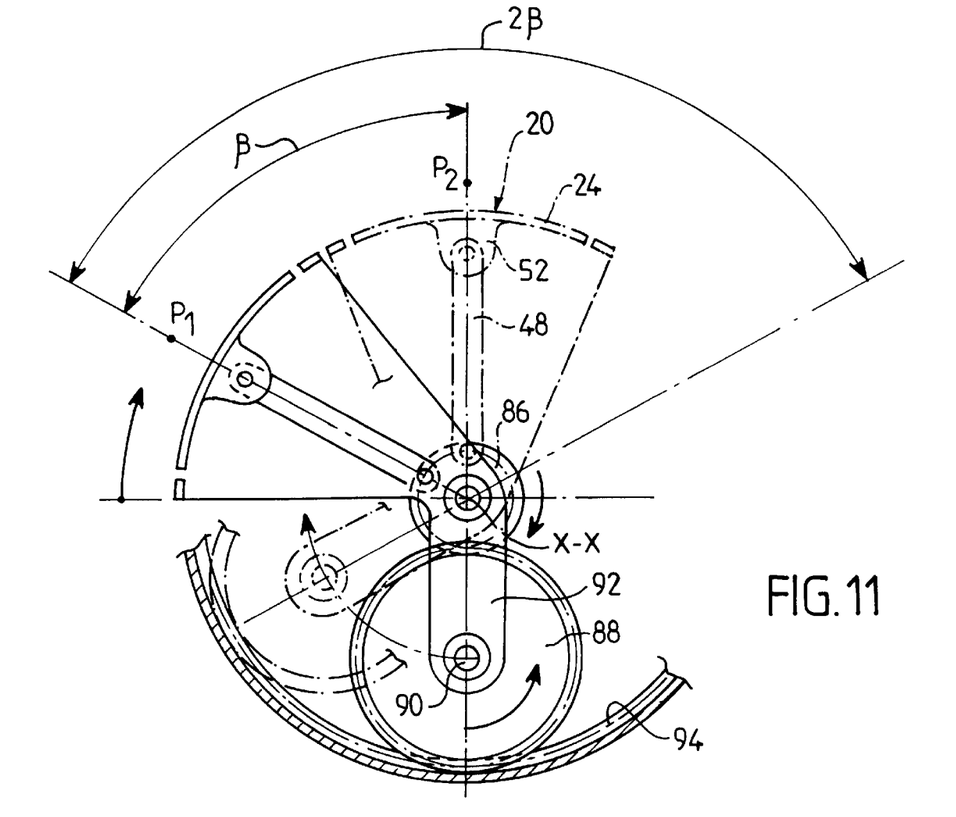
FIG. 11 is a partial view in transverse section of a device according to a fifth embodiment of the invention.

Reference is now made to FIG. 11, which depicts another embodiment of the invention.

As in the previous embodiments, the movable wall 24 of the shutter 20 is articulated at one end of a connecting rod 48, the other end of which is articulated on a lever. However, this lever forms part of a toothed pinion 86 mounted so as to rotate freely with respect to the rotation spindle 90 of the shutter and is driven in rotation by an intermediate pinion 88 mounted so as to rotate freely about an axis X—X with respect to a radial lever 92 forming part of the shutter. This intermediate pinion 88 cooperates with the toothed pinion 86 and with internal teeth 94 in the shape of an arc of a circle carried by the casing and centered on the axis of rotation X—X of the shutter.

Thus, by choosing the respective diameters of the toothed pinions 86 and 88 and of the teeth 94, it is arranged so that, in each of the closed positions of the shutter, the distance between the movable wall 24 of the shutter and the axis X—X is at a maximum. In the example in FIG. 11, two closed positions P1 and P2 are depicted, the movement of the shutter between one and other of these two positions being equal to β.

Figure 12:
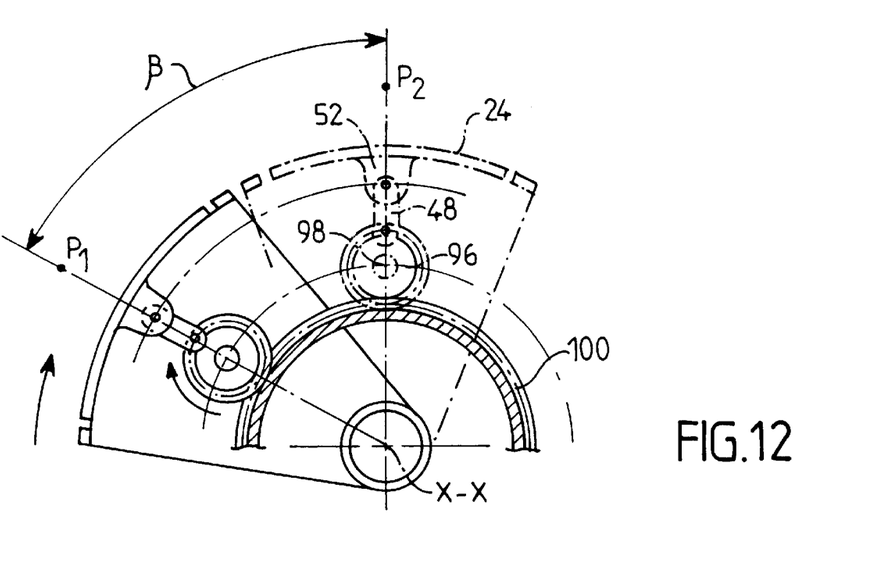
FIG. 12 is a partial view in transverse section of a device according to a sixth embodiment of the invention.

Reference is now made to FIG. 12, which constitutes a variant very similar to that of FIG. 11. In the example, the connecting rod 48 is articulated on a lever carried by another intermediate pinion 96 mounted so as to rotate freely about a spindle 98 carried by the shutter body. The pinion 96 meshes directly on external teeth 100 in the shape of an arc of a circle, integral with the casing, and centered on the axis of rotation of the shutter. As in the previous embodiments, the distance between the obturation wall 24 of the shutter and the axis X—X is at a maximum each time the shutter is in an obturation position, that is to say in the position P1 or P2 in the example under consideration.

In the embodiment in FIG. 11, as in that of FIG. 12, the pinion 86 or respectively 96 undergoes a rotation of 360° between two successive positions of the shutter, for example when passing from the position P1 to the position P2 or vice versa.

Figure 13:
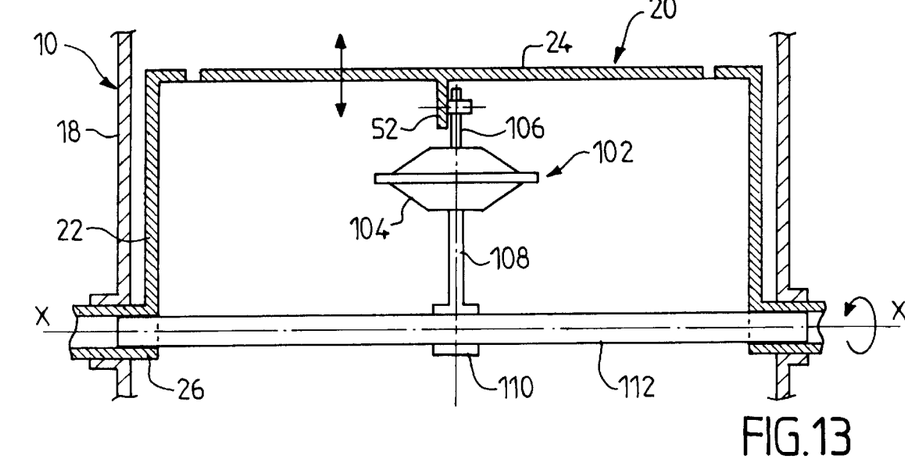
FIG. 13 is a partial view in longitudinal section of a device according to a seventh embodiment of the invention.

In the embodiment in FIG. 13, to which reference is now made, the translation control means of the movable wall 24 of the shutter comprise an actuator 102, such as for example a pneumatic cylinder or an electromagnet, comprising a body 104 provided with two extensions 106 and 108. The extension 106 is articulated on a support 52 connected to the wall 24, while the extension 108 is connected to a sleeve 110 surrounding a shaft 112, extending in the direction of the axis X—X, and around which the shutter pivots.

Figure 14:
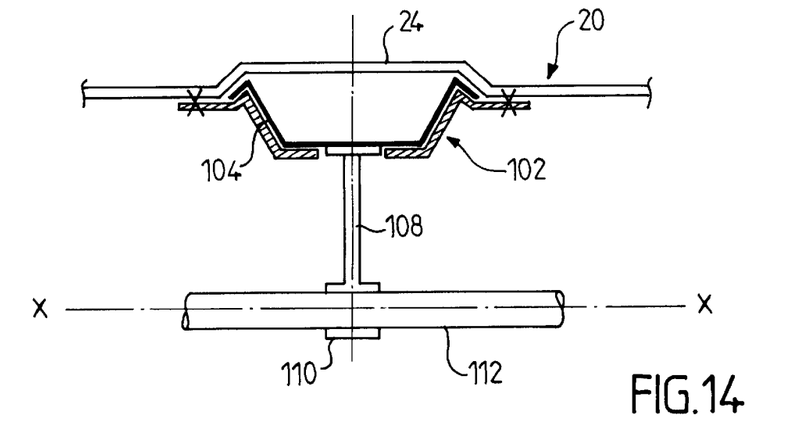
FIG. 14 is a view similar to that of FIG. 13 in a variant embodiment.

In the embodiment in FIG. 14, to which reference is now made, the body 104 of the actuator 102 is integrated directly into the shutter, that is to say more particularly into the wall 24, which makes it possible to omit the extension 106.

Figure 15:
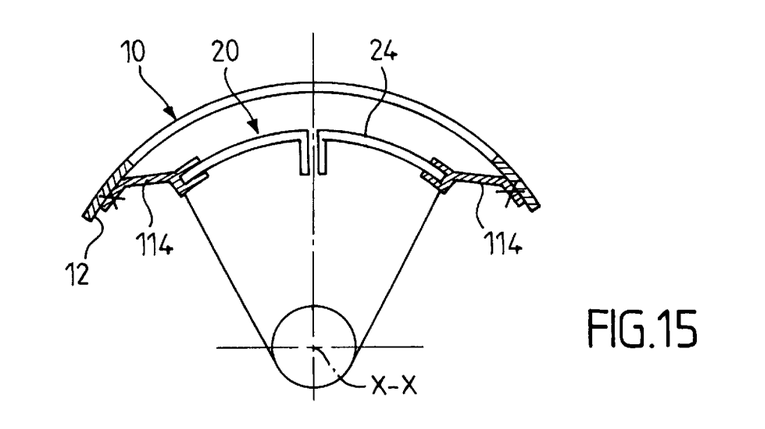
FIG. 15 is a partial view in transverse section in correspondence with FIG. 14.

As shown in FIG. 15, the obturation wall 24 of the shutter terminates in a peripheral sealing joint 114 which comes to cooperate internally with the cylindrical wall 12 of the casing when the shutter arrives in a closed position. Sealing is then provided by a deformation of the joint in the radial direction. When the shutter is next moved from one closed position to another, the movable wall 24 (and therefore the joint 114) moves closer to the axis X—X, so that the joint 114 does not undergo any friction.

Figure 16:
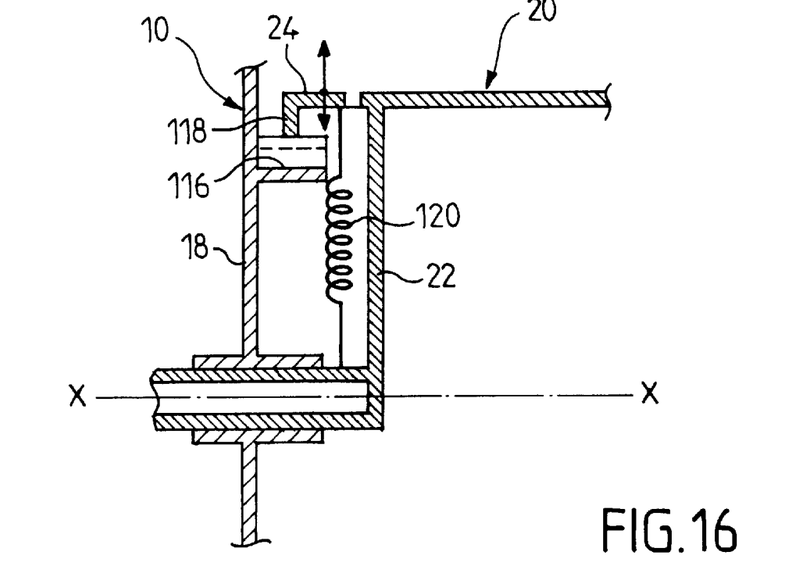
FIG. 16 is a partial view in transverse section of a device according to an eighth embodiment of the invention.
Figure 17:
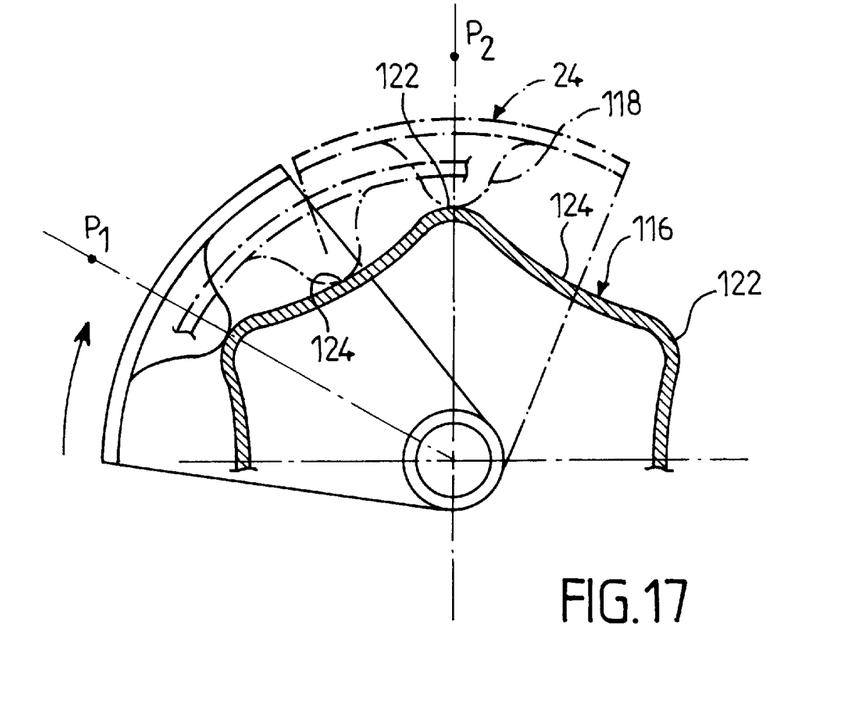
FIG. 17 is a partial view in transverse section in correspondence with FIG. 16.

In the embodiment in FIGS. 16 and 17, the translation control means comprise a cam track 116 carried by the plate 18 of the casing 10, on the internal side of the plate turned towards the shutter. The cam track 116 has a star-shaped profile (FIG. 17) and serves as a guide for a bearing finger 118 fixed to the obturation wall 24 of the shutter. The finger 118 is returned elastically in the direction of the axis X—X by a spring 120 depicted schematically in FIG. 16.

The cam track 116 has apexes 122 situated in correspondence with each of the closed positions (in the example, positions P1 and P2) and recessed zones 124. Thus, when the shutter is in one or the other of the closed positions, the distance between the obturation wall 24 and the axis X—X is at a maximum, while, when the shutter is in an intermediate position, this distance is at a minimum.

In the embodiment in FIGS. 18 to 22, the translation movement of the wall 24 is also effected by a cam device, but with a different structure.

In the example, the translation control means comprise at least one cam track 126 with an annular configuration, fixed to the body of the shutter 20. The cam track 126 surrounds four cam followers 128 disposed at 90° to each other and fixed to an annulus 130 which surrounds a square-shaped spindle 132 cooperating with an aperture 134. When the shutter is moved from one obturation position to another, the cam track 126 cooperates with the fingers 128, which are fixed with respect to the casing. The result is a radial translation movement of the wall 24, similar to the movement described previously.

Figure 18:
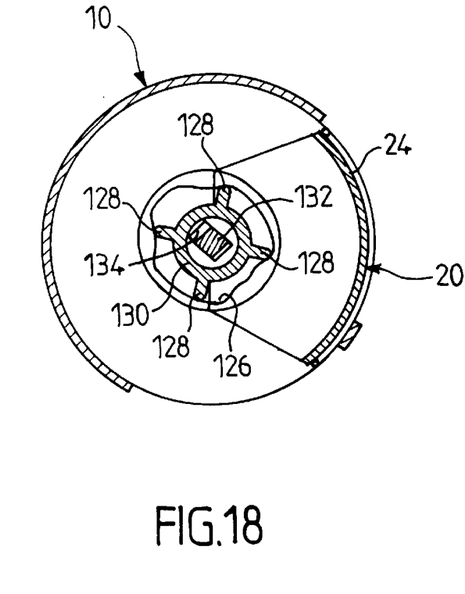
FIGS. 18 to 22 are views in transverse section of a device according to a ninth embodiment of the invention, depicted in different positions of use.
Figure 19:
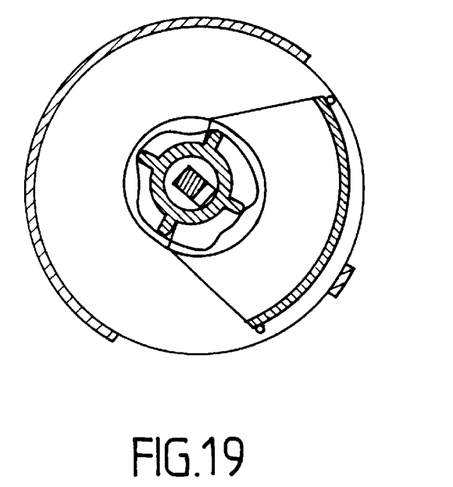
Figure 20:
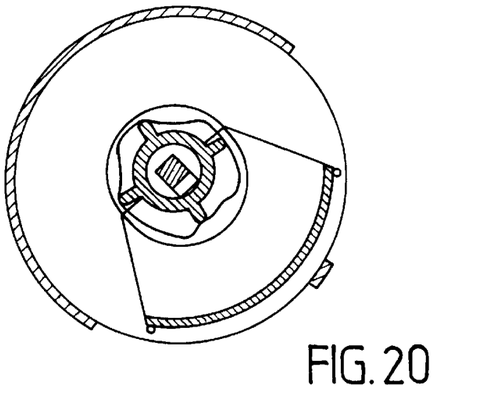
Figure 21:
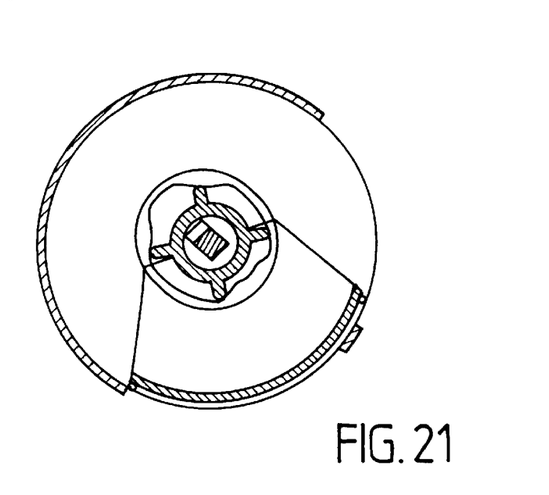
Figure 22:
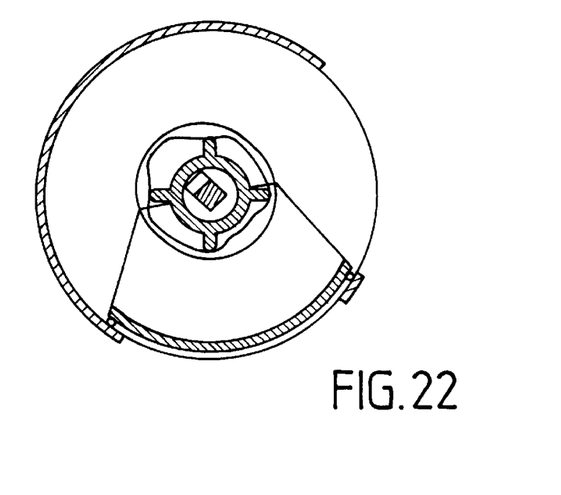

In the position depicted in FIG. 18, the shutter 20 is in a closed position and its obturation wall 24 is situated close to the cylindrical wall of the casing. On the other hand, in the intermediate positions of FIGS. 19 to 21, the wall 24 moves closer to the spindle 132. When the shutter arrives in the closed position in FIG. 22, the obturation wall 24 moves further away from the axis X—X and comes to provide a seal with the wall of the casing around the corresponding opening.

Figure 23:
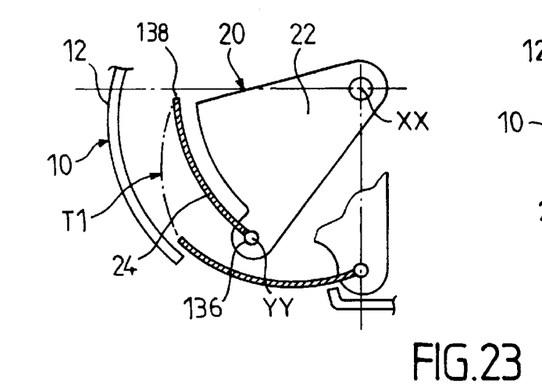
FIG. 23 is a partial view in transverse section of a device according to a tenth embodiment of the invention.

In the embodiment in FIG. 23, to which reference is now made, the obturation wall 24 is mounted so as to be movable in rotation between the plates 22 of the shutter 20 by means of pivots 136 along an axis Y—Y parallel to the axis X—X.

The obturation wall 24 can be moved with respect to the shutter body (plates 22) by suitable control means identical or similar to those described previously. When the shutter is in the open position, the obturation wall 24 is brought closer to the axis X—X whilst, when the shutter is in the closed position, the obturation wall 24 is away from the axis X—X.

In the embodiment in FIG. 23, the rotation movement of the shutter body and that of the obturation wall are simultaneous. As a result the free end 138 of the obturation wall 24 follows a path T1 as shown in FIG. 23.

Figure 24:
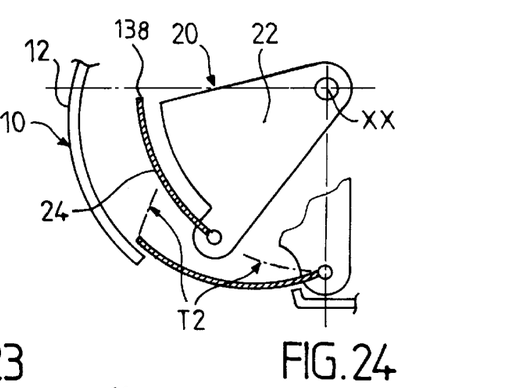
FIG. 24 is a view similar to that of FIG. 23 in a variant embodiment of the invention.

In the variant embodiment in FIG. 24, the two rotation movements are successive. While the shutter is moved from the open position to the closed position, the obturation wall 24 remains in a position close to the axis X—X. As soon as the shutter body reaches the open position, that is to say opposite the air passage opening in the casing, the obturation wall 24 is moved away from the axis X—X, while the shutter body remains immobile. As a result the end 138 of the obturation wall 24 follows a path T2 as shown in FIG. 24.

Figures 25, 26:
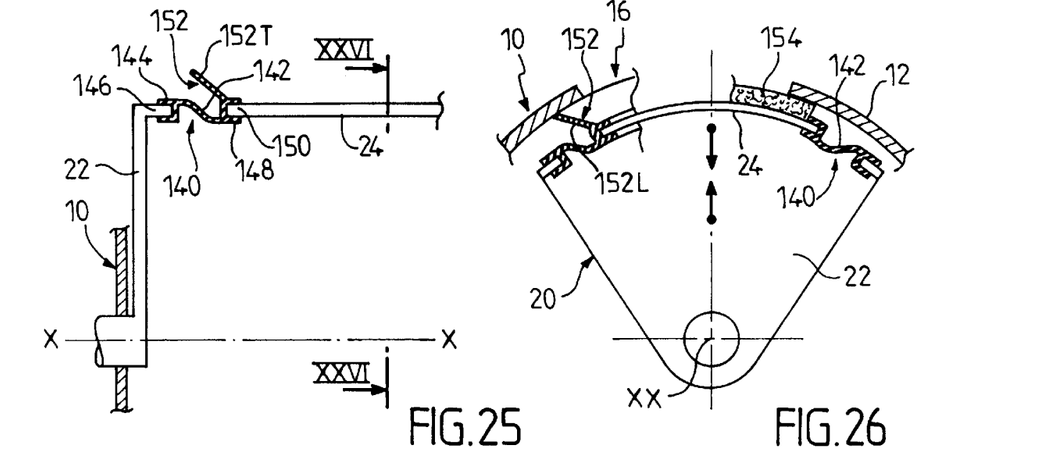
FIG. 25 is a partial view in longitudinal section of a device according to an eleventh embodiment of the invention.
FIG. 26 is a partial view in section along the line XXVI—XXVI in FIG. 25.

Reference is now made to FIGS. 25 and 26, which show a sealing joint 140 interposed between the plates 22 making up the shutter body and the obturation wall 24. The sealing joint 140 has a bellows 142 between an external peripheral rim 144 able to be attached to an edge 146 of the shutter body and an internal peripheral rim 148 able to be attached to an edge 150 of the obturation wall 24. In the example, the rims 144 and 148 are produced in the form of grooves moulded respectively onto the edges 146 and 150. The edge 146 delimits a kind of frame and is situated parallel to the axis of rotation X—X. Likewise, the edge 150, which extends over the entire periphery of the obturation wall 24, extends parallel to the axis of rotation X—X of the shutter. The bellows 142 makes it possible to provide a seal between the shutter body and the obturation wall 24, whatever their respective positions. In the closed position (FIGS. 25 and 26), the peripheral rims 144 and 148 are substantially in line with each other. On the other hand, in the open position, these two rims are offset with respect to each other.

The sealing joint 140 also has a sealing lip 152, which is produced in a single piece with the joint and which is attached to the internal peripheral rim 148 in order to provide a seal against the internal face of the wall 12 of the casing when the shutter is in the closed position (FIG. 26). The lip 152 is a flexible lip which extends over four sides and thus has two longitudinal sides 152L parallel to the axis of rotation X—X of the shutter (FIG. 26) and two transverse sides 152T (FIG. 25) both perpendicular to the axis of rotation X—X.

As a variant, the sealing joint is produced in the form of a foam joint 154 (FIG. 26) carried outside the obturation wall 24 of the shutter.

The bellows 142 is molded so as to have a configuration at rest which corresponds substantially to the configuration in the open position of the shutter. In the example in FIGS. 25 and 26, this corresponds to a configuration (not shown in the drawing) in which the peripheral rims 144 and 148 are offset. As a result the bellows has a tendency to return the obturation wall 24 into a position close to the axis of rotation X—X.

Figures 27, 28:
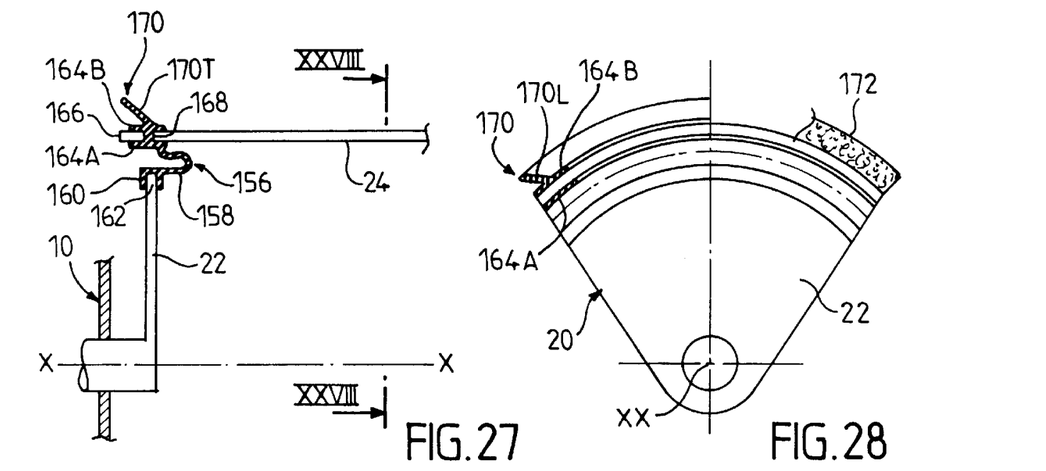
FIG. 27 is a partial view of a longitudinal section of a device according to a twelfth embodiment of the invention.
FIG. 28 is a partial view in section along the line XXVIII—XXVIII in FIG. 27.

Reference is now made to FIGS. 27 and 28, which show another sealing joint 156 interposed between the plates 22 constituting the shutter body and the obturation wall 24. The sealing joint 156 comprises a bellows 158 extending between an external peripheral rim 160 able to be attached to an edge 162 of the shutter body and an internal peripheral rim 164 able to be attached to an edge 166 of the obturation wall 24. In the example, the edge 162 of the shutter body extends perpendicularly to the axis of rotation X—X, whilst the edge 166 of the obturation wall 24 extends parallel to this axis of rotation.

The external peripheral rim 160 is produced in the form of a groove molded onto the edge 162 of the shutter body, whilst the internal peripheral rim 164 is produced in the form of a two parallel strips 164A and 164B moulded on each side of the edge of the obturation wall. The strips 164A and 164B are advantageously joined together by bridges of material 168 passing through suitable holes formed in the thickness of the wall at regular intervals (FIG. 27).

The joint 156 has a lip 170 similar to the lip 152 in FIGS. 25 and 26. This lip 170 also comprises two longitudinal sides 170L parallel to the axis of rotation X—X (FIG. 28) and two transverse sides 170T (FIG. 27) perpendicular to the axis X—X. As a variant, the sealing joint is produced in the form of a foam joint 172 similar to the foam joint 154 in the previous embodiment.

There again, the bellows 156 is molded so as to have a configuration at rest which corresponds substantially to the configuration in the open position of the shutter. This means that the bellows has a tendency to force the obturation wall 24 in the direction of the axis X—X.

Naturally, the invention is not limited to the embodiments described above by way of example and extends to other variants. Thus the nature of the means for providing the movement control for the obturation wall of the shutter and the nature of the transmission means for coordinating the rotation control means and movement control means are not limited to the examples described above.

The invention is particularly applicable to the distribution of a flow of cold, heated or conditioned air, in a motor vehicle heating and/or air conditioning installation.

What is claimed is:

1. An air distribution device comprising:
   a casing having a generally cylindrical wall with at least one air passage opening;
   a shutter movably mounted in the casing to pivot with respect to an axis of rotation, the shutter having an obturation wall and a shutter body comprising two plates, the obturation wall being movable in a direction substantially radial to an axis of rotation of the shutter body;
   rotation control means for causing the shutter to move to selected positions in which the obturation wall selectively controls the at least one air passage opening; and
   movement control means, in coordination with the rotation control means, for moving the obturation wall away from the wall of the casing to an open position and for moving the obturation wall towards the wall of the casing to a closed position.

2. The device according to claim 1, wherein the obturation wall is movable in translation with respect to the shutter body and the movement control means comprises translation control means.

3. The device according to claim 1, wherein the obturation wall is adapted to rotate with respect to the shutter body and the movement control means comprises the rotation control means.

4. The device according to claim 1, further comprising transmission means connected to the rotation control means and the movement control means, the transmission means having a selected transmission ratio, wherein the movement control means comprises a lever fixed to a drive spindle coaxial with the axis of rotation of the shutter body, the lever being articulated on the obturation wall of the shutter by at least one connecting rod.

5. The device according to claim 4, further comprising a drive shaft having fixed thereon a driving pinion for driving a toothed sector fixed to the shutter body and for driving a pinion fixed to the spindle of the lever with the interposition of an intermediate pinion.

6. The device according to claim 4, wherein the shutter is adapted to move between two closed positions with a given angular movement and wherein the transmission ratio is selected so that the lever turns through an angle of 360° minus the given angular movement, when the shutter pivots from one of the two closed positions to the other of the two closed positions.

7. The device according to claim 6, wherein, in each of the closed positions of the shutter, the connecting rod is situated in line with the lever so that the obturation wall of the shutter is always furthest away from the axis of rotation of the shutter body.

8. The device according to claim 4, further comprising a drive shaft having fixed thereon a drive pinion for driving a toothed sector fixed to the shutter body and a toothed sector driving a pinion fixed onto the rotation spindle of the lever.

9. The device according to claim 8, wherein the shutter is adapted to move between at least three closed positions with a given angular movement between two successive closed positions, and wherein the transmission ratio is selected so that the lever turns through an angle of 360° plus the given angular movement when the shutter passes from one of two consecutive closed positions to the other of two consecutive closed positions.

10. The device according to claim 4, further comprising a drive shaft connected to the shutter body and a transmission pinion loosely mounted around a spindle fixed to the shutter body, the transmission pinion meshing with a pinion fixed onto a spindle of the lever and with teeth in the shape of a circular arc carried by the casing, the teeth being centered on the axis of rotation of the shutter body and of the lever.

11. The device according to claim 10, wherein the transmission pinion, the pinion fixed onto the spindle of the lever and the teeth are situated outside the shutter.

12. The device according to claim 10, wherein the transmission pinion, the pinion fixed to the spindle of the lever and the teeth are situated inside the shutter.

13. The device according to claim 10, wherein the pinion fixed to the spindle of the lever is a pinion in the form of an annulus rotating about a hub secured to the shutter body, and wherein the transmission pinion, the pinion fixed to the spindle of the lever and the teeth are situated outside the shutter.

14. The device according to claim 1, wherein the movement control means comprises at least one connecting rod articulated on the obturation wall of the lever and on a transmission pinion loosely mounted around a spindle fixed to the shutter body, the transmission pinion meshing with teeth in the shape of a circular arc fixed with respect to the casing and centered with respect to the axis of the rotation of the shutter body.

15. The device according to claim 14, wherein the connecting rod is articulated directly on the transmission pinion, the transmission pinion is situated outside the shutter, and the teeth are formed on the casing.

16. The device according to claim 14, wherein the connecting rod is articulated directly on the transmission pinion, the transmission pinion is situated inside the shutter, and the teeth are integral with a fixed shaft on which the shutter body turns.

17. The device according to claim 14, wherein the connecting rod is articulated on a lever situated inside the shutter body and connected to the transmission pinion situated outside the shutter.

18. The device according to claim 4, wherein the lever forms part of a toothed pinion mounted so as to rotate freely with respect to the axis of rotation of the shutter and driven in rotation by an intermediate pinion cooperating with the toothed pinion and with internal teeth in the shape of a circular arc carried by the casing, the internal teeth being centered on the axis of rotation of the shutter.

19. The device according to claim 4, wherein the lever forms part of a toothed pinion mounted so as to rotate loosely about a spindle fixed to the shutter body the toothed pinion meshing on external teeth in the shape a circular arc fixed to the casing, the teeth being centered on the axis of rotation of the shutter.

20. The device according to claim 1, wherein the movement control means comprises an actuator selected from the group consisting of an electropneumatic cylinder and a solenoid valve, the actuator being interposed between the obturation wall of the shutter and the axis of rotation of the shutter.

21. The device according to claim 20, wherein the actuator is integrated into the obturation wall of the shutter.

22. The device according to claim 1, wherein the movement control means comprises at least one cam track carried by the casing and adapted to guide at least one bearing finger fixed to the obturation wall of the shutter, the bearing finger adapted to return elastically in the direction of a cam.

23. The device according to claim 1, wherein the movement control means comprises a cam track of annular configuration fixed to the shutter body and adapted to cooperate with at least one cam follower fixed to the casing.

24. The device according to claim 23, wherein the movement control means comprises four cam followers in the form of fingers disposed 90° with respect to each other and dependent on an annulus surrounding the axis of rotation of the shutter.

25. The device according to claim 1, wherein the obturation wall carries a sealing joint to provide a seal when the shutter is in the closed position.

26. The device according to claim 25, wherein the sealing joint is provided with a deformable lip extending at a periphery of the obturation wall.

27. The device according to claim 25, wherein the sealing joint has a bellows extending between an external peripheral rim adapted to engage an edge of the shutter body and an internal peripheral rim adapted to engage an edge of the obturation wall.

28. The device according to claim 27, wherein the edge of the shutter body and the edge of the obturation wall are parallel to the axis of rotation of the shutter, and wherein the external peripheral rim and the internal peripheral rim are substantially in line with each other when the shutter is in the closed position and offset with respect to each other when the shutter is in the open position.

29. The device according to 27, wherein the edge of the shutter body extends perpendicularly to the axis of rotation of the shutter and the edge of the obturation wall extends parallel to the axis of rotation of the shutter, the external peripheral rim and the internal peripheral rim extending perpendicularly to each other both in the open position and in the closed position of the shutter.

30. An air distribution device comprising:
    a casing having a generally cylindrical wall with at least one air passage opening; and
    a shutter, rotatably mounted in said casing, for controlling air flow through the at least one air passage opening, the shutter including a shutter body and an obturation wall, the obturation wall adapted to move in a direction substantially radial with respect to a rotational axis of the shutter body,
    wherein the obturation wall moves towards the cylindrical wall to close the at least one air passage opening and away from the cylindrical wall to open the at least one air passage opening.

* * * * *